United States Patent [19]

Harper et al.

[11] Patent Number: 5,764,508

[45] Date of Patent: Jun. 9, 1998

[54] DOCUMENT PROCESSING AND DATA DISTRIBUTION SYSTEM FOR AN AIR TRAFFIC CONTROL ENVIRONMENT

[75] Inventors: Richard H. R. Harper, Cambridge; Richard M. Bentley, Sawston, both of England

[73] Assignee: Xerox Corporation, Stamford, Conn.

[21] Appl. No.: 551,295

[22] Filed: Oct. 31, 1995

[30] Foreign Application Priority Data

Nov. 1, 1994 [GB] United Kingdom ............... 9422012

[51] Int. Cl.$^6$ ............................ G06F 3/00; G06F 19/00
[52] U.S. Cl. .......................... 364/148; 364/439; 364/443; 395/106; 395/492; 235/449; 235/454
[58] Field of Search ........................... 364/228, 229, 364/237.2, 243.2, 260.2, 931.4, 943.44, 948.2, 962, 439, 443; 348/231, 233, 143; 235/454, 449; 395/106, 131, 502, 508, 520, 492; 701/120; 340/973

[56] References Cited

U.S. PATENT DOCUMENTS

| | | | |
|---|---|---|---|
| 4,205,780 | 6/1980 | Burns et al. | 235/454 |
| 4,468,694 | 8/1984 | Edgar | 358/93 |
| 4,642,775 | 2/1987 | Cline et al. | 364/443 |
| 4,775,785 | 10/1988 | Nakahara et al. | 235/449 |
| 4,827,419 | 5/1989 | Selby, III | 364/443 |
| 4,870,633 | 9/1989 | Matsushita et al. | 369/47 |
| 4,975,696 | 12/1990 | Salter, Jr. et al. | 340/973 |
| 5,032,841 | 7/1991 | Shulenberger | 342/37 |
| 5,108,889 | 4/1992 | Smith | 435/4 |
| 5,200,901 | 4/1993 | Gerstenfeld et al. | 364/439 |
| 5,208,590 | 5/1993 | Pitts | 340/973 |
| 5,283,643 | 2/1994 | Fujimoto | 348/143 |
| 5,511,148 | 4/1996 | Wellner | 395/106 |
| 5,584,018 | 12/1996 | Kamiyama | 395/492 |
| 5,585,018 | 9/1993 | Kamiyama | 395/492 |
| 5,659,475 | 8/1997 | Brown | 701/120 |

FOREIGN PATENT DOCUMENTS

| | | |
|---|---|---|
| 0 424 803 A3 | 5/1991 | European Pat. Off. . |
| 0 495 622 A3 | 7/1992 | European Pat. Off. . |
| 0568161 | 11/1993 | European Pat. Off. . |
| 0 622 722 A2 | 11/1994 | European Pat. Off. . |

OTHER PUBLICATIONS

Great Britian Search Report dated Aug. 16, 1995.

*Primary Examiner*—James P. Trammell
*Assistant Examiner*—Cuong H. Nguyen

[57] ABSTRACT

An information processing system for an air traffic control environment using portable media to represent information about air flights, which portable media represent information by printing, hand drawn signs and projected signs. The information processing system includes memory, a processor, and a first and a second workstation. The memory stores a database of data items relating to air flights, a number of the data items being represented on a respective portion of a portable medium corresponding to one of the air flights. Each of the workstations includes means for removably mounting the portable media in an array, a camera and a projector focused on the array. Coupled to the memory, the processor responds to a user marking by hand a sign on a first portable medium at the first workstation by causing the projector associated with the second workstation to project just the sign onto a second portable medium at the second workstation. In further response, the processor also updates the database in the memory.

9 Claims, 8 Drawing Sheets

FIG. 1A

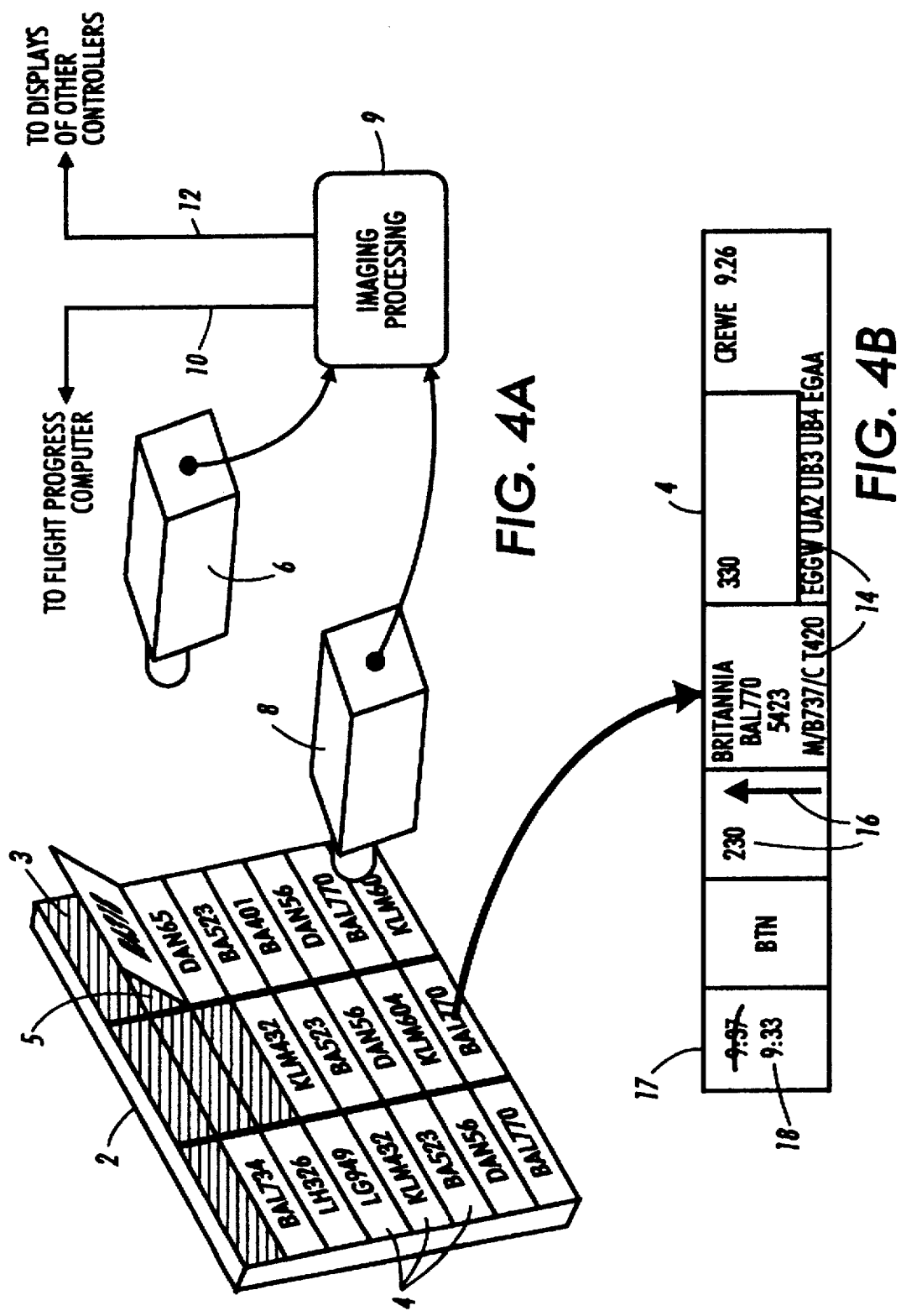

DOCUMENT PROCESSING AND DATA DISTRIBUTION SYSTEM FOR AN AIR TRAFFIC CONTROL ENVIRONMENT

FIELD OF THE INVENTION

This invention relates to a document processing and data distribution system, and in particular to one in which a user manipulates documents relating, to activities, such that the manipulations give rise to the distribution of updated information to an electronically stored database and/or to other users.

BACKGROUND OF THE INVENTION

In modern air traffic control (ATC) environments, the ever-increasing volume of traffic requires new methods to assist controllers with their tasks. An ATC workstation commonly includes a computer terminal on the controller's desk to access a database, and a rack mounted on the wall above the terminal on which strips of paper or card, one strip for each flight, are placed, removed, annotated, moved around, etc. There is a need to integrate the currently paper-based flight strips—which are manipulated by air traffic controllers—with the electronic radar information systems provided via external data links. This would give flight progress computers information on controllers' intentions, which controllers currently record by simply writing, on the paper strips, in turn facilitating calculation of more accurate arrival/departure times, and provision of more sophisticated tools such as advance collision avoidance systems (ACAS).

Previous proposals for this integration problem have centered around the complete replacement of paper strips with electronic analogues, enabling flight computers to capture information on controllers activities directly through interaction with the electronic strip interface. Invariably, such techniques have resulted in deterioration on ATC service provision, and their failure highlights the functionalities of the paper strips. These include the ease with which the paper strips can be stacked up vertically in front of the controller, 'cocked' out of position to indicate potential control problems, passed between controllers and, perhaps most importantly quickly and flexibly annotated with a pen.

SUMMARY OF THE INVENTION

An information processing system will be described that includes a memory for storing a database of data items relating to activities, a number of the data items being represented on a respective portion of a portable medium corresponding to one of the activities, a processor, coupled to the memory, for updating one or more of the data items in response to a user operation, and a plurality of workstations. Each workstation includes means for removably mounting the portable media in an array, a rack, and a camera and a projector focused on the array. Each camera and projector is coupled to the processor, allowing them to respond to user operations such as marking a sign on a portable medium.

The video camera located above each controller's flight strips act as an input device for the flight progress computers. The video projector, adjacent to the camera, overlays information generated by the computer on top of the flight strips. When a controller annotates a paper strip with a pen, the annotation is captured by the camera, extracted from the image and processed by the flight progress computer. The results of this processing can be fed to other computer-based tools. As necessary, the results of the raw annotations can be displayed on other controllers' flight strips by dedicated computer-controlled image projectors.

This invention augments the conventional ATC arrangement, preserving the benefits of paper-based 'direct interaction', while providing the enhancement of integrated information systems. The solution is ideal in that it does not require the replacement of paper flight progress strips but integrates the paper strips with the electronic flight progress computers, allowing annotations by pen to be captured, processed and propagated as necessary.

BRIEF DESCRIPTION OF THE DRAWINGS

Embodiments of the invention will now be described, by way of example, with reference to the accompanying drawings, in which:

FIG. 1A shows a simplified diagram of a conventional ATC suite.

FIG. 4A is a schematic illustration of the arrangement of flight strip rack, camera and projector at each controller's workstation.

FIG. 4B shows an electronically augmented flight progress strip.

DETAILED DESCRIPTION

Figure 1A:
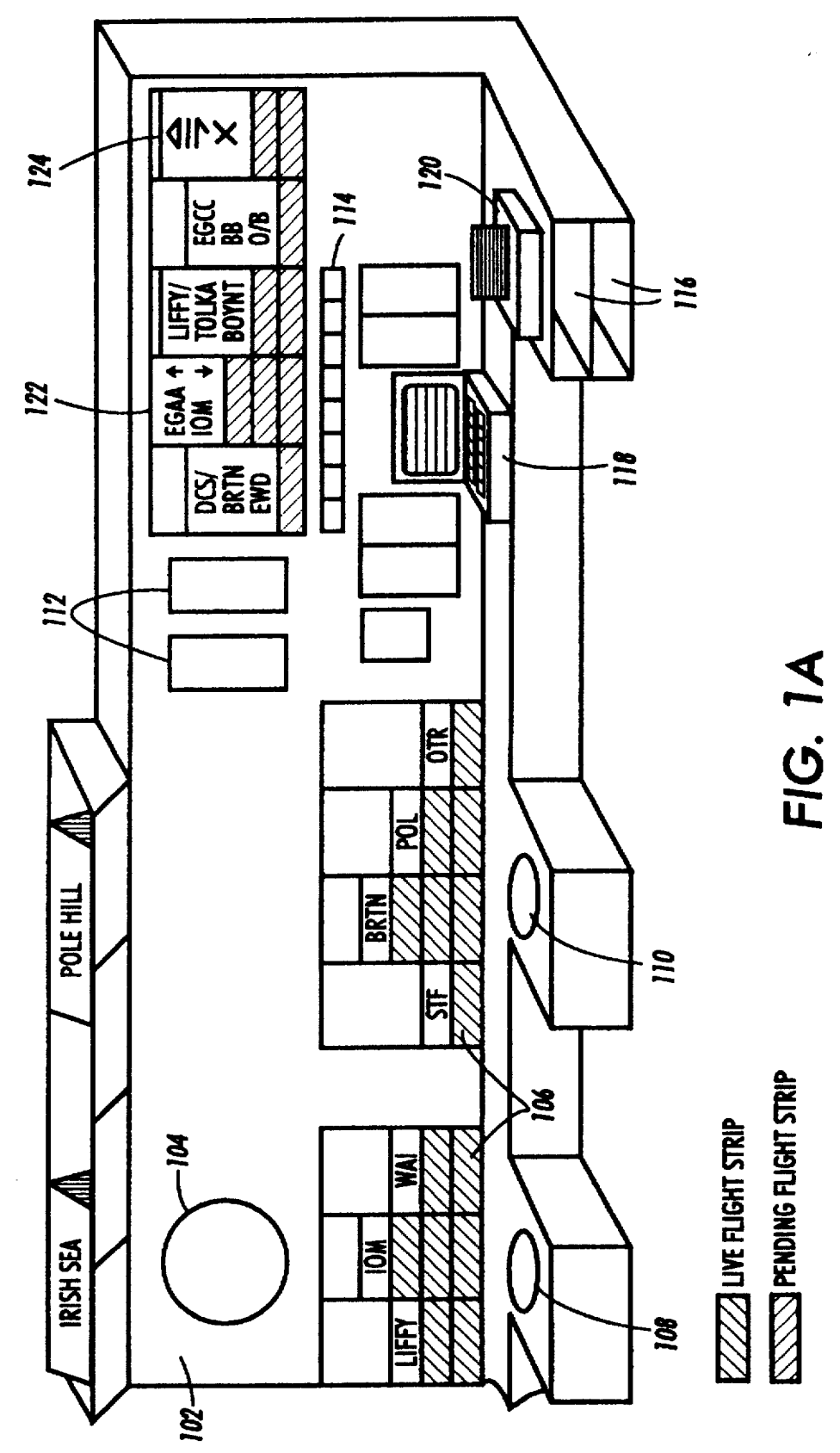
Figure 1B:
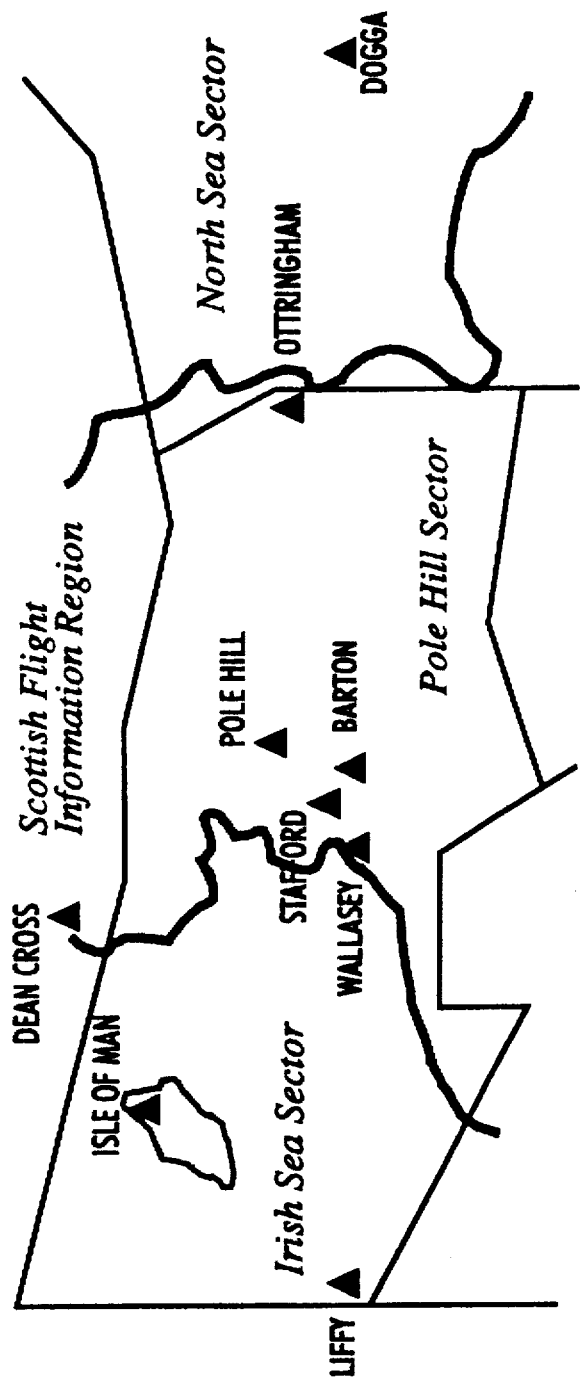
FIG. 1B shows the geographical region covered by that ATC suite.

Referring to FIG. 1A, a simplified diagram of a conventional ATC suite (at Pole Hill) is shown, which is not to scale. In particular, Designator Strips are all the same size (the size of a flight strip) and the width of the strip rack 'bays' is uniform. The map FIG. 1B shows how Designator Strip positions correspond to geographical locations of the reporting points they represent.

As shown in FIG. 1A, the ATC suite typically includes static map displays 102, an early warning radar (showing all LATCC airspace), live strip racks 106, and radar displays 108, 110 (in this case for the Irish Sea and Pole Hill sectors, respectively). In addition, the ATC suite includes chinographs 112 with weather information, pigeon holes 114 for 'hour blocks' of dead flight strips and empty strip holders 116. A computer terminal 118 gives the ATC controller access to the database, and enables the controller to print out strips on the connected printer 120.

Figure 2:
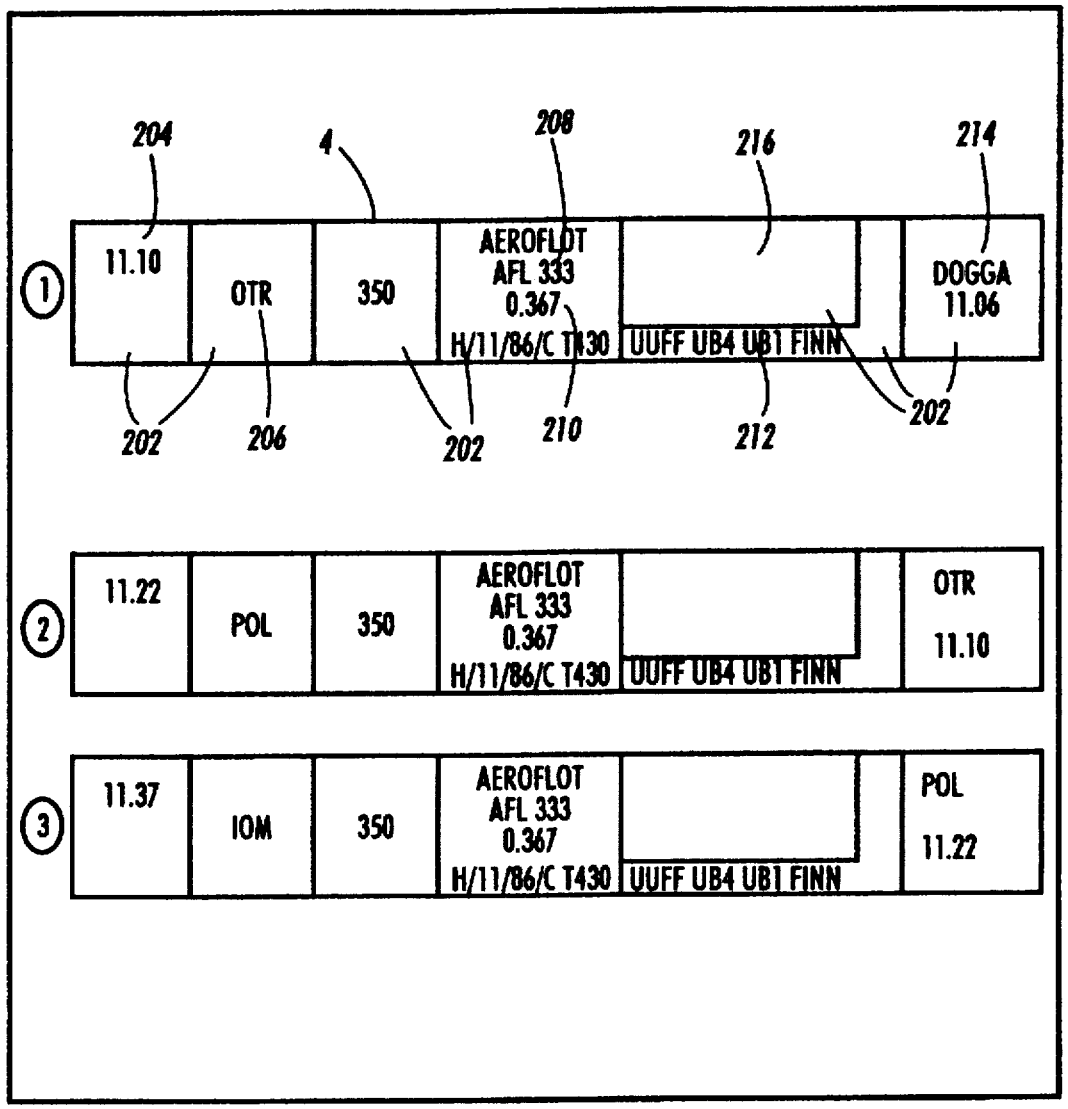
FIG. 2 shows examples of live flight strips printed for a single aircraft.

FIG. 2 shows examples of live flight strips printed for a single aircraft (they are not based on actual flight strips but are included as examples of strip arrangement). Strips ① and ② are for the Ottringham and Pole Hill reporting points, respectively, and would be placed in front of the Pole Hill sector controller shown in FIG. 1B. Strip ③ is for the Isle of Man reporting point and would be placed in front of the Irish Sea sector controller.

Each flight strip 4 is preferably of a standard format, and has a number of sections or portions 202, each section 202 having a predetermined purpose, i.e. as a location for a printed data item and/or as a place in which controllers can make annotations. The data items printed on the strip typically include the arrival time 204 at the reporting point, the identifier 206 of the reporting point the strip is for, the call sign 208, the squawk indent 210, route information 212 and the last reporting point and time 214. Section 216 provides a scribble box for controllers in which to make annotations.

Figure 3A:
FIG. 3A illustrates a first typical controller annotations of a flight strip.
Figure 3B:
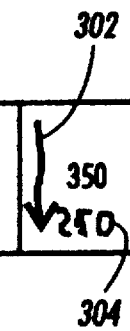
FIG. 3B illustrates a second typical controller annotation of a flight strip.
Figure 3C:
FIG. 3C illustrates a third typical controller annotations of a flight strip.

FIGS. 3A–3C illustrate typical controller annotations of flight strips. In FIG. 3A a "clean" strip is shown. FIGS. 3B and 3C show respectively a strip marked by hand by a controller with signs 302 and 304 to indicate a requested action in relation to the flight, and a strip marked by hand by a controller with sign 306 to indicate a completed action.

FIG. 4A schematically illustrates the arrangement of flight strip rack, camera and projector at each controller's workstation, while FIG. 4B shows an electronically augmented flight progress strip. The rack 2 is mounted above the controller's VDU terminal(s) (displaying radar data such as current aircraft position; not shown), and supports paper flight strips 4 which in this case are arranged in three columns. A camera 6 and a video projector 8 are focused on the array of flight strips 4, and both are connected to image processing hardware 9. A controller sits in front of the rack 2 and is able to talk to the pilots of the aircraft and other controllers using a radio/telephone. The image processing hardware 9 may be as described in detail in U.S. Pat. No. 5,511,148 to Wellner, which is incorporated herein by reference corresponding to published European application EP-A-622,722, and in implementing the present invention, image processing techniques described in that application may be used, modified, as appropriate and/or as described below. Via link 10, annotation data giving information on the future state of the airspace can be added to data from other sources such as radar processing, to allow development of systems such as conflict detection and collision alert. Also, via link 12, annotations can be propagated to other controllers' displays (VDU or video projectors) and superimposed on appropriate flight strips.

In FIG. 4B an electronically augmented flight progress strip is shown: the strip has pre-printed information 14, hand-drawn annotations 16, and annotations 18 superimposed by the projector 8. The hand-drawn annotation 16 may be in different colors (corresponding to controllers at different levels of responsibility in the ATC room), and the image processing system may incorporate simple techniques for distinguishing between the markings of different colors, i.e. so that the marks of a supervisory controller take priority over those of a lower level controller.

In the preferred embodiment, the hand-drawn annotations 16 are captured by the camera processed where necessary by performing handwriting recognition techniques which are known in the art; and then this information is propagated to the workstation of selected other ATC controllers. The video projector 8 at each of the selected workstations is commanded by the processing system 9 to display the information (which in the case of characters and numerals has preferably been converted into and appropriate font) in a suitable section of the corresponding flight strip 4. In FIG. 4, the marking 18 has been made by a controller at a remote workstation, and has been processed and displayed by the video projector 8 at the current workstation in the appropriate section 17 of the strip 4.

Figure 5A:
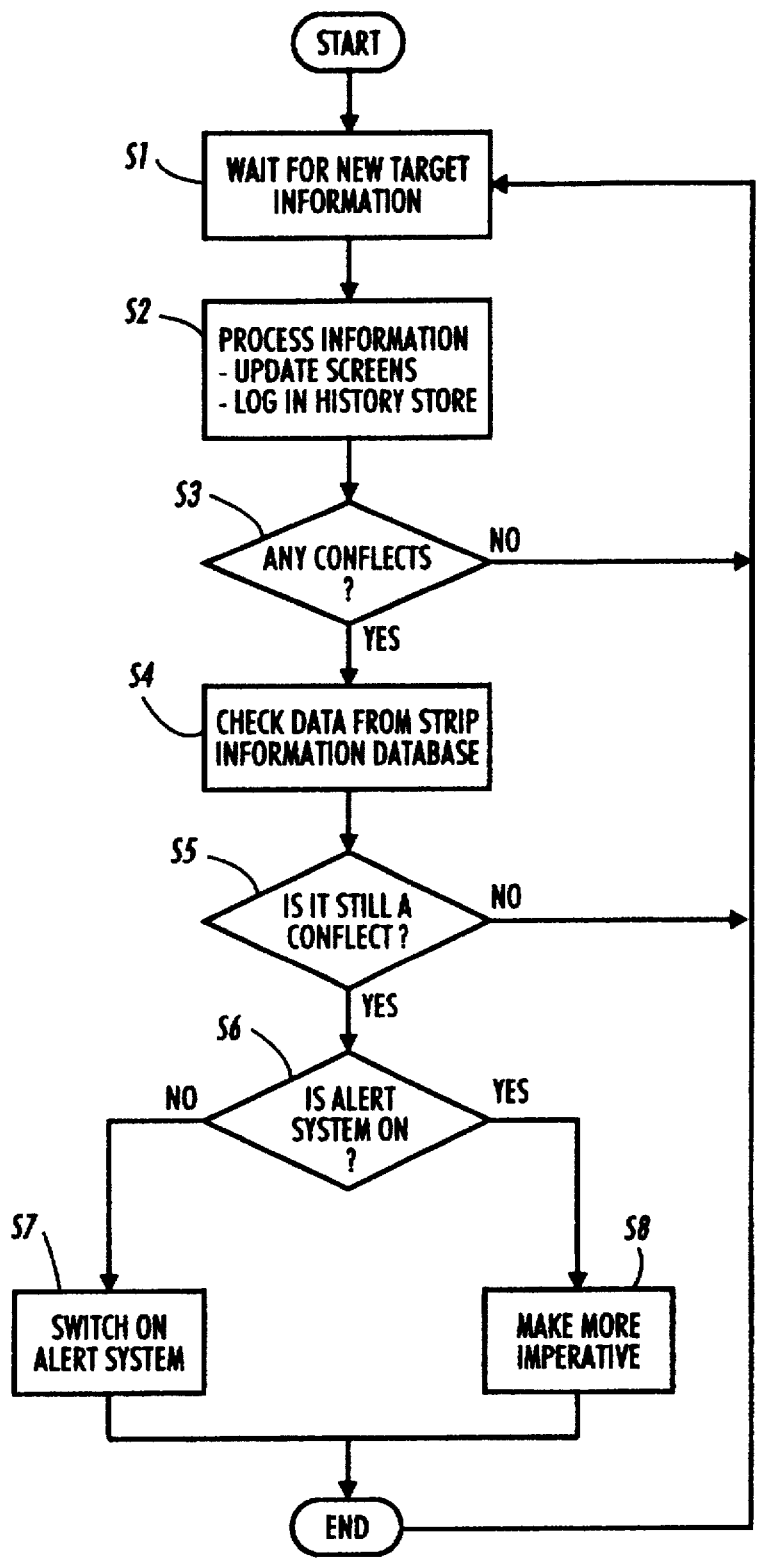
FIG. 5A is a flow chart of the data processing operations relating to radar data and flight information.
Figure 5B:
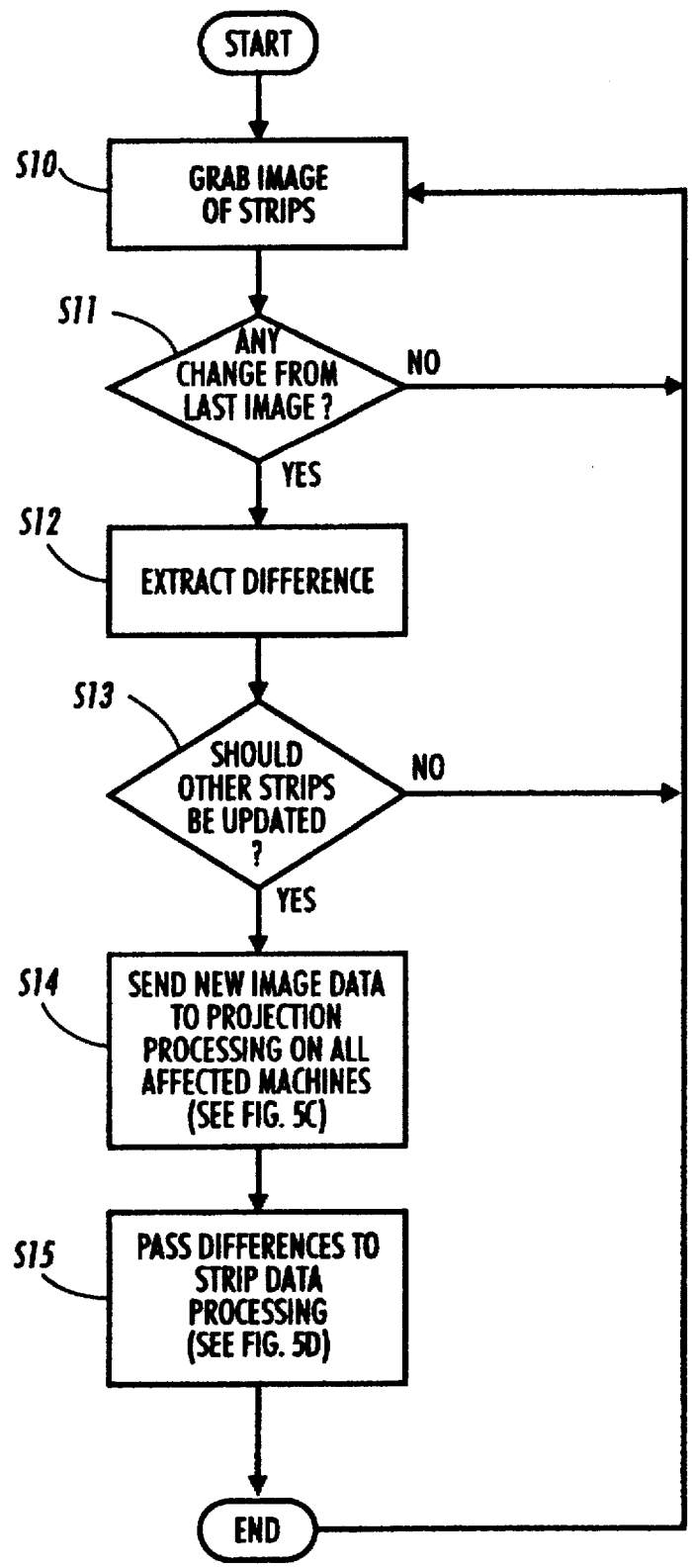
FIG. 5B to 5D show the image processing techniques in the processing of the flight strips.
Figure 5C:
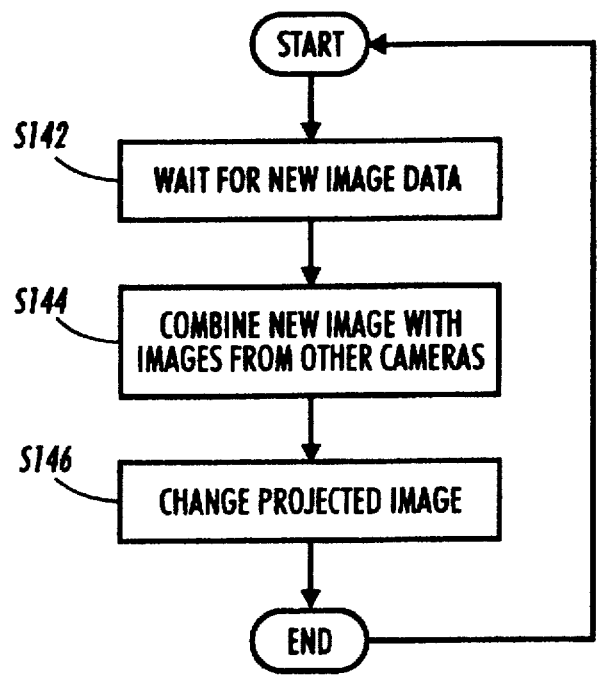
Figure 5D:
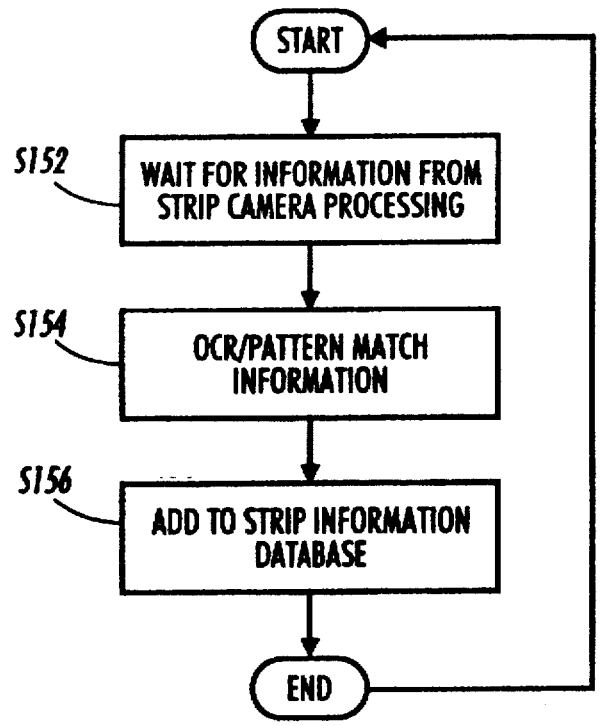

FIG. 5A shows a flow chart for the data processing operations relating to radar data and flight information, while FIGS. 5B–5D are flow charts of the image processing employed when a controller carries out manipulations on a paper flight strip. The instructions for these operations are stored in a memory device within the personal computer forming part of the ATC suite. These instructions may be implemented in any appropriate computer language. The methods of these flowcharts are implemented via a processor executing the instructions stored in memory. This processor may be any commercially available device. Similarly, the memory may be any commercially available semiconductor logic device, such as SRAM, DRAM, ROM, PROM, EPROM, or flash.

Traditionally, ATC controllers mark flight strips when decisions are made relating to a flight. These decisions affect the path of the aircraft, and hence the work of other controllers. These changes (decisions) are manually relayed between controllers, but are not entered into the integrated radar data and flight plan processing systems.

By employing the present invention, the information processing systems will have more detailed and accurate data reflecting both (a) radar data and flight plan data, and (b) controlling data.

The data processing operations relating to radar data and flight information are shown in FIG. 5A. Initially, the processor waits (step S1) for receipt of new target information (i.e. relating to an incoming flight). On receiving such information, the processor information uses the in step S2 to update the screen displays of appropriate controllers and as updated information to be logged into the history store (not shown)of the data processing system.

At step S3, the processor checks for any conflicts with currently processed flights, and if there is none the processor returns to waiting for new target information at step S1. In the event of a conflict being found, the data from the strip information database is read by the processor and checked at step S4. At step S5 the processor further analyzes the situation to establish whether there is still a conflict with any currently processed flight. If there is none, the processor returns to waiting for new target information (at step S1).

If it is found that the conflict remains, the processor checks during step S6 whether the alert system is on, and if it is not, then the processor switches on the alert system at step S7. If the alert system is already on, it is switched to a more imperative stage in the warning procedure.

The image processing employed when a controller carries out manipulations on a flight strip are shown in FIG. 5B. In step S10, the processor captures an image of the paper flight strips 4 in the controller's rack 2. A check is then made to find if there is any change from when the image of the strips was last grabbed, and if there is no change, the processor returns (after a predetermined time which may be set in a conventional way beforehand) to grab a new image of the strips.

If a change has occurred, the processor extracts the difference (e.g. on a pixel-by-pixel basis, see U.S. Pat. No. 5,511,148) at step S12. This step preferably includes the discarding of spurious artifacts in the image, as is known in the art (e.g. Jähne B., Digital Image Processing, Ch. 6, Springer-Verlag, Heidelberg, 1991), and handwriting or optical character recognition techniques which are known in the art. In this way, the information which has been added (e.g. a controller's annotation) is determined.

At step S13 checks the processor to establish whether flight strips of other controllers need to be updated (i.e. via their video projector). This may include comparing the information determined in step S12 with a table of possible markings (corresponding to possible controller commands/ decisions) stored in memory (not shown). If other strips have to be updated, the processor sends new image data (step S14) to the projection processing hardware of all affected workstations (controllers). This step is described in further detail below with reference to FIG. 5C. Thereafter, the information obtained from the differencing step (S12) is passed to the strip data processing (described in further detail below with reference to FIG. 5D).

FIG. 5C illustrates the substeps of step S14 in FIG. 5B. Initially, the processor waits (step S142) for the new image data. Then, the processor combines the new image data at step 144 with images from the cameras at other controllers' workstations. Finally, the projected image is changed at step 146 causing a change in projected annotations 18 on paper strips 4.

FIG. 5D illustrates the substeps of step S15 in FIG. 5B. Initially, the processor waits (step S152) for information from the strip camera processing of FIG. 5C. Once this information has been received, the processor performs an OCR/pattern matching operation on the information at step S154. Thereafter, the processed information is added (step S156) to the strip information database stored in memory.

In one embodiment of the invention, the rack 2 may be adapted to support the strips not only in a position where the strips are flat with their planes parallel to the plane of the rack, but in one or more alternative positions, for example 'cocked' out of position to indicate potential control problems. This processing technique may be incorporated into step S12 of FIG. 5(b). For example, each holder in the rack 2 may be capable of supporting a strip 4 so that it is tilted away from the plane of the rack (see FIG. 4A with the top edge of the strip spaced apart from the plane of the rack, and the strip may thereby make an angle of 30–50 degrees with the plane of the rack. When in such a position, the strip unveils a portion 5 (see FIG. 4B) of the rack's planar surface 3 above the top edge of the strip 4. The planar surface 3 may be of a color or gray level which provides sufficient contrast with respect to the material of the flight strips for the image processing to determine that the portion 5 is exposed and therefore that the strip 4 is tilted out of the normal position. Alternatively, as will be apparent to the person skilled in the art, it may be possible to support a strip rotated by 90 degrees while remaining parallel to the plane of the rack 2; and the image processing may include a routine for sensing this disposition accordingly. Such a technique means that the potential control problem is both immediately visible to the local controller and the fact that it exists is readily distributable to other controllers who need to be aware of it.

We claim:

1. An information processing system for an air traffic control environment using portable media to represent information about air flights, the portable media being capable of representing information by printing, hand drawn signs and projected signs, the information processing system comprising:

memory for storing a database of data items relating to air flights, a number of said data items being represented on a respective portion of a portable medium corresponding to one of said air flights, a processor, coupled to the memory, for updating one or more of said data items in response to user operations including marking by hand a sign on a portable medium, a first workstation and a second workstation, each workstation comprising means for removably mounting the portable media in an array, a camera and a projector focused on the array, each camera and projector being coupled to the processor, wherein the processor responds to a user marking by hand a sign on a first portable medium at the first workstation, and causes a projector associated with the second workstation to project just the sign onto a second portable medium at the second workstation, the processor also responding to the user marking by hand the sign of the first portable medium by updating the database in the memory.

2. The system according to claim 1, wherein the processor further converts the sign drawn by hand into a standard representation before it is projected onto the second portable medium.

3. The system to claim 1, wherein the processor further recognizes signs of different shapes, said different shapes representing different statuses of said activities.

4. The system according to claim 1, wherein the processor further recognizes signs of different colors, said different colors representing different statuses of said activities and/or different users.

5. The system according to claim 4, wherein the processor modifies data items stored in the database in response to a color of the sign(s).

6. The system according to claim 1, wherein said user operations include moving a portable medium from a first position to a second position, and wherein the processor further determines whether said portable medium is in said first position or said second position.

7. An automatic method of processing information relating to flights in an air traffic control system, the air traffic control system including a processor, a memory, a database, a first workstation and a second workstation, the database storing flight information, each workstation including means for mounting portable media, each portable medium including information about one flight, each portable medium being capable of representing the information by printing, hand drawn signs and projected signs, each workstation including a camera and a projector, the camera being both focused on the means for mounting portable media and the projector projecting information onto the portable media, the processor being coupled to the camera and the projector associated with the first workstation and the second workstation, the image processor implementing the method by executing instructions stored in the memory, the method comprising the steps of:

a) capturing a first image of information on the portable media associated with the first workstation at a first time;

b) determining whether there is a difference between the information in the first image and information in a second image of the portable media associated with the first workstation at a second time, the difference including signs drawn by hand;

c) extracting the difference between the information in the first image and the information in the second image if the difference exists;

d) determining whether the portable media associated with the second workstation should be modified based upon the difference; and e) transmitting the difference to the projector associated with the second workstation.

8. The method of claim 7 further comprising the step of: transmitting the difference to the database.

9. An article of manufacture comprising:

a) a memory device; and b) instructions stored on the memory device, the instructions representing a method of processing information relating to flights in an air traffic control system, the air traffic control system including a processor, a memory, a database, a first workstation and a second workstation, the database storing flight information, each workstation including means for mounting portable media, each portable medium including information about one flight, each portable medium being capable of representing the information by printing, hand drawn signs and projected signs, each workstation including a camera and a projector, the camera being focused on the means for mounting portable media and the projector projecting information onto the portable media, the processor being coupled to the camera and the projector associated with the first workstation and the second workstation, the processor implementing the method by executing instructions stored in the memory, the method comprising the steps of:

1) capturing a first image of information on the portable media associated with the first workstation at a first time;

2) determining whether there is a difference between the information in the first image and information in a second image of the portable media associated with the first workstation at a second time, the difference including signs drawn by hand;

3) extracting the difference between the information in the first image and the information in the second image if the difference exists;

4) determining whether the portable media associated with the second workstation should be modified based upon the difference; and 5) transmitting the difference to the projector associated with the second workstation.

* * * * *